Oct. 2, 1956   T. G. HARE   2,765,063
CENTRIFUGAL FRICTION TYPE CLUTCH
Original Filed Sept. 9, 1950   2 Sheets—Sheet 1
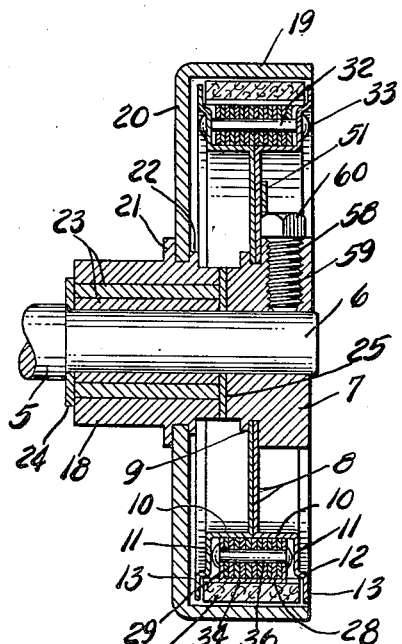
Fig. 2
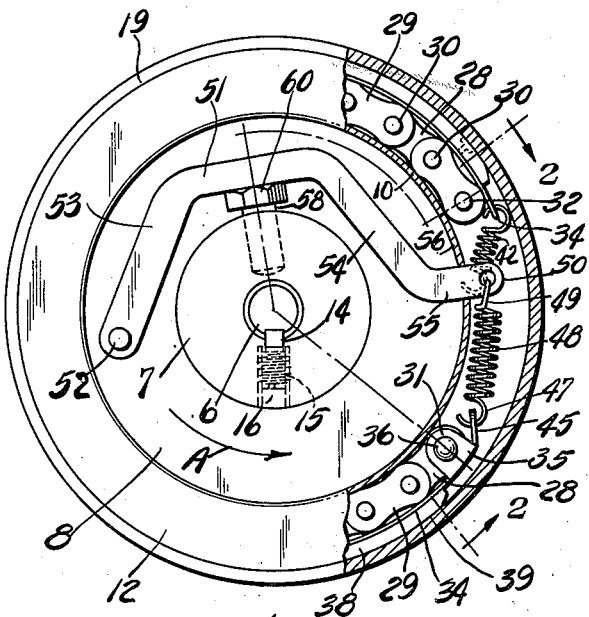
Fig. 1
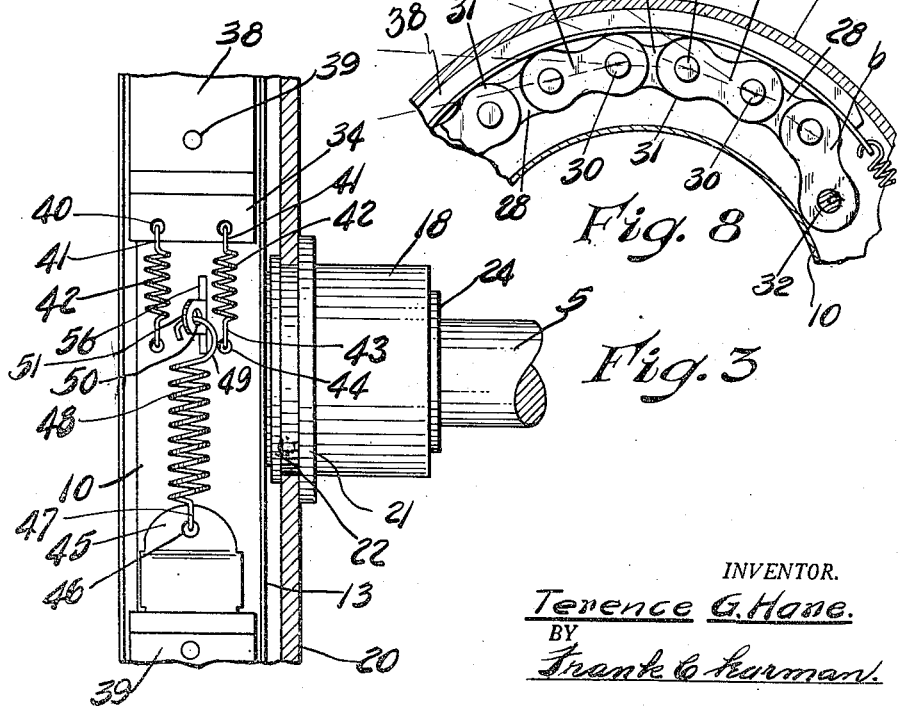
Fig. 8
Fig. 3
INVENTOR.
Terence G. Hare.
BY Frank C. Kurman.
ATTORNEY Oct. 2, 1956 T. G. HARE 2,765,063
CENTRIFUGAL FRICTION TYPE CLUTCH
Original Filed Sept. 9, 1950 2 Sheets-Sheet 2

INVENTOR.
Terence G. Hare.
BY
Frank C. Leaman.
ATTORNEY

United States Patent Office 2,765,063
Patented Oct. 2, 1956

2,765,063

CENTRIFUGAL FRICTION TYPE CLUTCH

Terence G. Hare, Detroit, Mich.

Continuation of application Serial No. 183,997, September 9, 1950. This application November 26, 1951, Serial No. 258,209

22 Claims. (Cl. 192—105)

The present invention relates to an automatic clutch, and more particularly to a centrifugal friction type clutch for drivingly connecting two rotating members when one of the members attains a predetermined angular velocity.

One object of the invention is to provide a centrifugal friction type clutch in which a friction element is moved into engagement with a clutch drum by centrifugal force created by an articulatible rotating element which is energized by the friction element to exert additional force on the friction clutch element.

Another object is to provide an automatic clutch having a friction clutch element to initiate the self-energizing action when the driven clutch part attains a predetermined angular velocity.

Another object is to provide an automatic clutch of the centrifugal friction type having a flexible link chain arranged in such a manner that the centrifugal force created by rotating the link chain at a predetermined speed will urge a friction clutch element into frictional engagement with a cooperating clutch element.

Another object is to provide an automatic clutch of the friction type having a centrifugal actuator formed of an articulatible link chain and arranged such that the circumference of the chain will expand after the friction element has been urged into engagement with a cooperating clutch part, and thus further force the friction element into contactual engagement with said cooperating clutch part throughout the entire circumference of said frictional element.

Another object is to provide an automatic friction type clutch having a link chain actuator which is controlled by the angular velocity of the driven member in such a manner as to exert a radial force against a friction clutch element, and thus initiate a self-energizing action of the link chain so that the knuckles thereof will be buckled and be forced outwardly in a radial direction by the expansion of the circumference of the link chain and exert an additional radial force on the friction clutch element.

Another object is to provide an automatic clutch of the friction type having a centrifugal actuator consisting of an articulatible link means having one end connected to the driven element, and its opposite end floatingly and yieldingly supported on the driven element, whereby said link actuator will co-act with said friction element and clutch member to apply a progressive wedging action between the friction means and the clutch member, and thereby urge the friction element into frictional engagement with a cooperating clutch part.

Another object is to provide an automatic friction clutch having a link chain actuator for urging a clutch band into frictional engagement with a cooperating clutch part through centrifugal force exerted by the link chain on said clutch band when the speed of angular rotation reaches a predetermined velocity such that the initial action of the clutch band will cause the links of the chain to buckle and expand circumferentially, and thus lock the cooperating clutch parts in driving relationship.

Another object is to provide an automatic friction clutch of the above-mentioned type in which the trailing end of the link chain is connected to the driven clutch element, while the opposite end is yieldingly connected to the driven clutch element by means of a coil spring having an adjusting lever for adjusting the tension of said spring and regulating the engagement of said clutch element at certain speeds.

Another object is to provide an automatic friction clutch in which the clutch band has its leading edge connected to the floating end of the link chain, while its opposite end is yieldingly connected to the inner clutch part such that relative movement between the clutch band and centrifugal link chain actuator will take place to engage and disengage the clutch parts at various predetermined speeds of angular rotation.

Another object is to provide an automatic clutch assembly having an adjusting lever for regulating the tension exerted on one end of the link chain actuator, whereby the link chain actuator will overcome the spring tension at predetermined speeds and initiate the clutching action between the cooperating clutch parts.

The instant application is a continuation of my co-pending application Serial No. 183,997, filed the 9th day of September 1950, and now abandoned.

Other objects and advantages of the invention will become apparent during the course of the following description of the accompanying drawings wherein:

Figure 1 is a side elevational view of the clutch assembly showing portions of the cooperating clutch elements broken away to illustrate various structural details including the adjusting lever for the yielding link chain actuator support.

Figure 2 is a diametrical cross-sectional view taken on the angular radial lines 2—2 of Figure 1 looking in the direction of the arrows and illustrating the manner in which the friction clutch band and link chain actuator are housed within one of the cooperating clutch elements.

Figure 3 is an enlarged, fragmentary elevational view showing the outer clutch element in section to illustrate the manner in which the flexible clutch band is yieldingly supported at both ends and connected to the inner clutch element.

Figure 6:
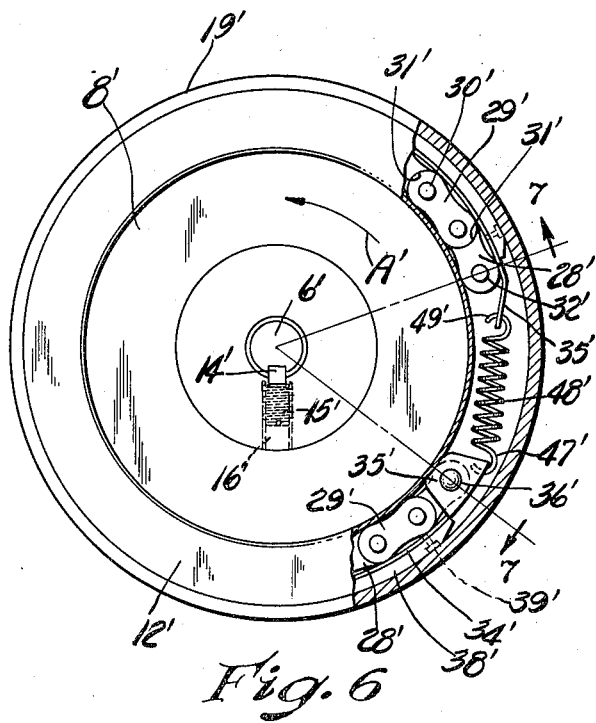
Figure 5:
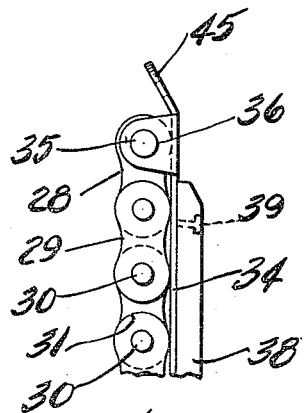
Figure 5 is an enlarged, fragmentary, side elevational view of the centrifugal link chain actuator, further showing the manner in which the flexible clutch band is attached to the free floating end of the link chain actuator.
Figure 4:
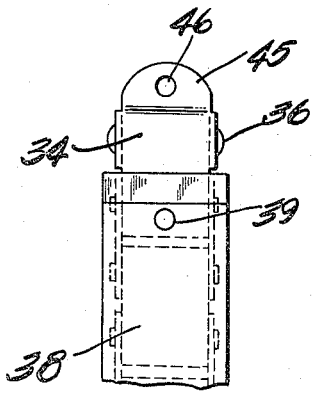
Figure 4 is an enlarged, fragmentary elevational view showing the manner in which the flexible clutch band is connected to the floating end of the centrifugal link chain actuator.

Figure 6 is a side elevational view of a modified form of the invention, showing an automatic clutch assembly similar to Figures 1 to 5 inclusive, but in which the adjustable lever is omitted and the free floating end of the centrifugal link chain actuator is yieldingly anchored or secured to the other end of the link chain actuator, portions of the inner and outer clutch elements being broken away and in section to clearly illustrate the manner in which this is accomplished.

Figure 7:
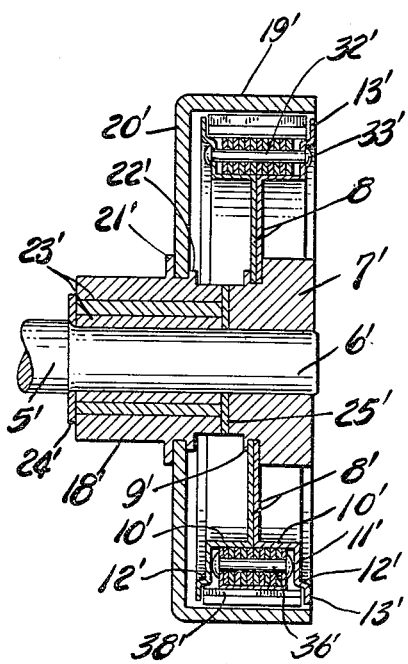

Figure 7 is a diametric, cross-sectional view taken on the angular radial lines 7—7 of Figure 6, and looking in the direction of the arrows, to illustrate the manner in which the chain link actuator has one of its ends connected to the inner clutch element and its free end floatingly mounted for radial movement, and Figure 8 is an enlarged, fragmentary, side elevational view showing the expansion radially outward of the link chain actuator when the clutch is engaged, the broken lines indicating the angle of thrust.

In the drawings, and more in detail, attention is first directed to Figures 1 to 5 inclusive, wherein for the purpose of convenience of illustration there is shown a drive shaft 5, one end of which is connected to a prime mover (not shown) such as an internal combustion engine or electric motor. Of course, the clutch assembly can be used for drivingly connecting and coupling shafts of other devices where it is desired to transmit motion of the rotary type from one unit to another. The other end of the shaft 5 is reduced in diameter as at 6, and has secured thereto the hub 7 of an inner clutch member formed by complemental disks 8 secured to the hub 7 by upsetting the metal as at 9 of the hub. The peripheral edges of the complemental disks 8 are bent in opposite directions as at 10 and are further angularly bent as at 11 to form radial walls 12. The radial walls 12 terminate in offset flanges 13, and said radial walls 12 and flanges 13 form therebetween an annular channel for receiving the chain link actuator and friction element in a manner which will be hereinafter more fully described. The hub 7 of the inner clutch element is secured to the shaft 6 by means of a key 14 held in place by means of a set screw 15 which is received in corresponding threads in an internal bore 16.

Rotatably mounted on the reduced portion of the shaft 6 is the hub 18 of an outer clutch element which includes a drum 19 connected to the hub 18 by means of a radial wall portion 20 of disk-like formation. The radial wall portion 20 is provided with a central opening for receiving the hub 18, and said hub is provided with a radial flange 21 which abuts against one side of the disk-like member 20 and is held in place by upsetting metal as at 22 on the opposite side of the disk-like member 20. Thus, the outer clutch unit is rigidly secured to the hub 18 and bearing sleeves 23 are interposed between the hub 18 and reduced portion 6 of the shaft which may be formed of a suitable bearing metal such as bronze or the like. A thrust washer 24 engages a shoulder on the shaft 5 formed by the reduced portion 6 and prevents axial movement of the hub 18 in one direction. The hub 7 of the inner clutch member is arranged on the opposite side of the hub 18 and a thrust washer 25 is interposed therebetween to prevent axial movement of the hub 18 in the opposite direction. Thus, the inner and outer clutch elements are arranged on the shaft 6, and the hub 18 can be connected to a suitable member by means of gearing or belting for power transmission. Such a drive is conventional and need not be shown or described.

The drum structure 19 is of a diameter to freely rotate with respect to the inner clutch member, and the drum portion extends over the peripheral edge of the inner clutch member to completely house the same. It is intended to rotate the shaft 5 and inner clutch member 8 in a counter-clockwise direction as indicated by the arrow A (see Fig. 1 of the drawings).

Positioned in the annular channel in the peripheral walls of the inner clutch member between the radial portions 12 of the opposed flanges 10 is an articulatible link chain composed of a series of sets of chain links 28 and 29 arranged in interdigitating relation and connected at their ends, one to the other, by pins 30. Each of the chain links 28 and 29 is provided with enlarged and rounded end or knuckle portions 31 similar to the links of a roller chain, and said enlarged end portions are provided with openings for receiving the connecting pins 30. These rounded knuckle portions 31 facilitate any buckling action of the chain which occurs during the secondary engaging phase, and provides the important progressive wedging action, assuring a final non-slipping engagement of the clutch members. It is to be understood that each link unit 28 and 29 is composed of a plurality of chain links arranged in spaced-apart, side by side relation with the links 28 having their ends interfitting between adjacent links 29. The chain thus formed has considerable weight due to the fact that each link unit is composed of a plurality of chain links. One end of the chain formed by the links 28 and 29 is connected to the flanges 12 of the inner clutch member by means of a connecting pin 32 which is located transversely and extends through the walls 12 and has its ends upset as at 33, the connecting pin 32 taking the place of the pin 31. Thus, with the inner clutch member rotating in the direction of the arrow A (Figure 1), the trailing end of the link chain is connected to said inner clutch member, while the opposite end is floatingly mounted and free to move circumferentially. It will be apparent, therefore, that the chain is pushed rather than pulled in its rotational movement and that the link chain formed by the links 28 and 29 extends substantially around the entire circumference of the inner clutch member, and is arranged between the walls 12 forming the peripheral channel.

Also positioned in the peripheral channel of the inner clutch member, between the opposed, offset flanges 13 thereof, is a flexible metal band 34 which encircles substantially the entire outer circumference of the chain 28—29. The leading end of the flexible band 34 is provided with a pair of ears or spaced-apart lugs 35 through which extends a second, transversely positioned connecting pin 36 carried by the leading end of the leading chain link 28 of the link chains 28—29, the pin 36 taking place of the usual link pin 31. Thus, it will be seen that the chain 28—29 has its trailing end connected to the inner clutch member by pin 32 and the flexible metal band has its leading end connected to the leading end of the chain 28—29 by pin 36. Pin 36 is not connected to the walls 12 and hence the leading end of the metal band is in a sense free.

Mounted on the outside of the band 34 and thus interposed between the clutch drum 19 and the flexible metal band 34 is a flexible friction band 38 which may be formed of an asbestos composition or the like and which band may be either bonded thereto or riveted as at 39 at spaced-apart points by means of rivets or other fastening means to form a friction unit, and it will be obvious that members 34 and 38, as a unit, connected to the chain by pin 36, will be pulled or trailed, thus eliminating any tendency to shudder or grab.

The trailing end of the flexible metal band 34 which extends slightly beyond the trailing end of the link chain, has formed therein a pair of laterally spaced apertures 40 (Fig. 3) for receiving the hooked ends 41 of a pair of coil springs 42. The opposite ends of the coil spring 42 are provided with hooked ends 43 which are received in apertures 44 formed in the opposed flanges 10 of the inner clutch member mounted on the hub 7.

The leading end of the flexible metal band 34 is provided with an inwardly bent tab 45 having an aperture 46 for receiving the hooked end 47 of a coil spring 48, the opposite end of which is provided with a similar hooked end 49 received in an opening 50 in one end of an angular adjusting lever 51. The adjusting lever 51 is pivotally connected by means of a pin 52 to one side of the flanges 8 of the inner clutch member and includes angular portions 53 and 54 extending about the hub 7 of the inner clutch member. The free swinging end 55 of the adjusting lever projects through a circumferential slot 56 in one of the opposed flanges 10 in such a manner that rocking movement of the lever 51 will increase or decrease the tension of the coil spring 48.

In order to adjust the lever 51, a machine screw 58 is threaded in a correspondingly threaded bore 59 in the hub 7, and said machine screw extends radially with its head portion 60 disposed beneath or on one side of the adjusting lever 51. Thus, when the machine screw 58 is turned in an unthreading direction or counterclockwise, the lever 51 will be moved in a direction to increase the tension on the coil spring 48.

It will thus be seen that the link chain 28—29, flexible band 34 and friction band 38 are yieldingly and adjustably connected at their leading ends by the coil spring 48 to the inner clutch member 8, and that the floating or trailing end of the flexible metal band 34 and friction band 38 adjacent the pin 32 are similarly yieldingly connected to the inner clutch member by the coil springs 42.

In operation, considering the form of the invention shown in Figures 1 to 5 inclusive, it will be assumed that the shaft 5 is driven or rotated in a counterclockwise direction and is being driven or rotated from a position of rest to a speed approaching the limits of the R. P. M. output of the motor. As the shaft 5 and inner clutch member, including the parts 7, 8, 10, 11 and 12 are rotated in a counterclockwise direction, the centrifugal force created by the rotational movement of the chain links 28—29 will cause the entire chain to expand radially, the end link b swinging about the anchor pin 32 (see Fig. 8 of the drawings), this radial movement exerting radial force throughout substantially the entire circumference of the chain, and thereby urging the friction band 38 into frictional engagement with the inner peripheral wall of the drum 19. As this occurs, the chain links 28—29, starting at the leading end, will be crowded in a clockwise direction in the channel between the opposed flanges 12, the springs 42 and 48 elongating to permit said crowding, and said crowding of the flexible chain 28—29 will cause the links to buckle and urge the knuckle portions 31 of the chain links 28—29 into engagement with the flexible metal band 34, the angle of thrust being indicated at T in this same figure. This crowding or buckling condition applies a progressive wedging force between the friction band and the clutch drum and produces a self-energizing effect such as to urge the flexible friction band 38 into tight, frictional engagement with the inner peripheral surface of the outer drum 19 and thereby cause rotation of the hub 18 with the shaft 5. Suitable driving mechanism, when connected to the hub 18, will effect a drive coupling between the shaft 5 and the mechanism connected to the hub 18.

In order to adjust the clutch to respond to different predetermined speeds of rotation, the adjusting screw 58 is turned in a direction to increase or decrease the tension of the coil spring 48 and thus permit the friction lining 38 to engage the inner peripheral surface of the drum 19 at the desired speed of shaft rotation. Thus, the centrifugal force exerted by the links 28—29 at predetermined speeds, initiates frictional engagement of the clutch band 38 with the drum 19 and after this initial frictional contactual engagement, the circumference of the link chain expands to produce a self-energizing action and urge the knuckle portions 31 into engagement with the inner surface of the flexible metal band 34 and increase the radial pressure on the flexible friction clutch band 38.

In the modified form of the invention shown in Figures 6 and 7, a rotary shaft 5' is connected to a prime mover for being rotated in a counterclockwise direction. The end of the shaft is reduced as at 6' and has affixed thereto the collar 7' or hub of an inner clutch member. The hub 7' has its inner end reduced in diameter to form a shoulder for receiving a pair of disk-shaped members 8' arranged in face-to-face relation, with the reduced portion of the hub extending through a central opening therein. The hub 7' is upset as at 9' to securely hold the disk-shaped members 8' in position. A spline or key 14' extends into a slot in the shaft 6' aligned with a slot in the hub 7', and said key is held in place by means of a set screw 15'. The peripheral portions of the disks 8' extend in opposite directions to form the floor of a channel structure as at 10', and said opposed portions extend radially as at 12' and terminate in offset flanges 13'. The outer clutch member includes a drum 19' having a radial wall 20' which is secured to a hub or collar 18' mounted on the shaft 6'. An annular flange 21' is formed on the collar 18', and the radial portion 20' of the drum is provided with a central opening for receiving the collar 18' so that the flange 21' will abut one wall thereof. The metal on the opposite side of the radial wall 20' is upset as at 22' to clampingly secure the drum to the collar 18'. Bearing bushings 23' formed of bronze or the like are interposed between the shaft 6' and the collar 18', and a thrust washer 24' abuts the enlarged portion of the shaft 5' to prevent endwise movement of the collar 18'. Similarly, a thrust washer 25' is interposed between the hub 7' and collar 18' to prevent endwise movement of said collar and drum 19' in an opposite direction.

The inner clutch member is adapted to be rotated as before in the direction of the arrow A' (Figure 6) such that the disks 8' and channel structure carried by the peripheral edge thereof will rotate in a counterclockwise direction. The outer clutch drum 19' is free to rotate on the shaft 5' and as pointed out in connection with the form of the invention shown in Figures 1 to 5 inclusive, the collar 18' may be drivingly connected to a device or machine by suitable gearing (not shown), to drivingly couple a prime mover such as a motor or the like with said machine or device.

Positioned in the peripheral channelway of the inner clutch member between the flanges 12' is a link chain formed by means of a plurality of interconnected links 28' and 29'. Each link 28' is composed of a plurality of spaced-apart links which are arranged in interdigitating relation with a plurality of spaced apart links 29'. The plurality of chain links 28'—29' are connected as before by chain pins 30', and each link 28'—29' is provided with enlarged end portions 31', forming knuckles having openings for receiving the connecting pins 30'. The chain structure is identical to that shown in Figures 1 to 5 inclusive, and the trailing end of the chain has its series of links 28' connected and anchored in the annular channelway by means of a transverse pin 32' extending through suitable openings in the radial flanges 12' of the inner clutch member. The ends of the pins 30' and 32' are upset to prevent displacement of the pins. The link chain is arranged to extend around substantially the entire circumference of the inner clutch member and is positioned within the peripheral channelway formed by the opposed flanges 10' and radial flanges 12'. The leading end of the link chain opposite the anchoring pin 32' is arranged for circumferential movement.

Connected to the leading or free end of the link chain 28'—29' is a flexible metal band 34' which encircles the outer periphery of the link chain. The metal band is provided on one end with a pair of spaced-apart lugs or ears 35' having apertures for receiving a pin 36' which extends through correspondingly arranged openings in the leading end set of chain links 28'. The trailing end of the flexible metal band 34' is provided with an angular end portion forming a tab 35' (see Fig. 6).

A coil spring 48' (see Fig. 6) has one of its ends hooked as at 49' for being received in an aperture in the tab 45', while the other end is hooked as at 47' into a similar opening in the opposite end of the metal band 34' adjacent the pair of spaced ears 35'. Thus, one end of the link chain is yieldingly connected to the opposite end of the flexible band 34' by said coil spring 48'.

Secured to the outer side of the flexible metal band 34' is a strip of clutch facing material 38' which may be composed of asbestos composition material as commonly used in clutches and brakes, and said friction band may be secured to the metal band by circumferentially spaced-apart rivets 39' or by bonding. Thus, radial outward movement of the flexible metal band will urge the friction band 38' into frictional contact with the inner peripheral surface of the drum 19'.

The coil spring 48' is formed of a pre-selected spring wire having sufficient tension to resist the centrifugal force of the link chain under predetermined speeds of shaft rotation. In other words, the tension of the spring 48' may be predetermined such that the link chain will be permitted to expand circumferentially outwardly when the shaft 5' and inner clutch member are rotated at a selected speed. When the link chain 28'—29' is moved outwardly by the centrifugal force after the inner clutch member has attained said pre-selected speed, the friction member 38' is urged into frictional engagement with the inner peripheral surface of the drum 19', and as before, initiates the self-energizing action of the chain links.

It will thus be seen that when the inner clutch member has attained a predetermined speed to urge the friction band 38' into engagement with the inner periphery of the drum 19', said drum will be rotated as will also be the collar 18'. By interposing the clutch member between various devices and machines, said clutch will automatically couple various rotating parts of said devices and machines after the speed rotation of the inner clutch member has reached a predetermined angular velocity.

In both forms of the invention as shown in Figures 1 to 5, and 6 to 8 inclusive, the link chain expands circumferentially outwardly under centrifugal action to provide an initial frictional engagement with the drum, and thus to initiate the secondary engaging phase or self-energizing action which causes the link chain to buckle and shorten and further expand peripherally outwardly and thereby to exert a very powerful radial force on the clutch band by virtue of the wedging action, at the points of contact such as the knuckles 30 and 30' (Figures 1 and 6 respectively). The term "articulatible" for purposes of this specification means capable of assuming a jointed or segmented state or condition. The term "buckling" as used in connection with the actuator means being compressed in the sense that length is reduced and there is expansion in a radial direction at an angle relative to the lengthwise extension of the actuator.

It is to be understood that the forms of the invention herewith shown and described are to be taken as preferred embodiments, and that various changes in the shape, size and arrangement of parts may be resorted to without departing from the spirit of the invention or the scope of the subjoined claims.

What I claim is:

1. In a speed responsive clutch, relatively rotatable clutch members having disposed therebetween friction means adapted for initial frictional engagement with one of said members responsive to centrifugal force, and articulatible link means comprising circumferentially disposed links pivotally connected one to another progressively buckling and coacting with said friction means and one of said clutch members to apply a progressive wedging force between said friction means and the related clutch member responsive to the initial frictional engagement of said friction means.

2. In combination, relatively rotatable clutch members, friction means adapted for initial frictional engagement with one of said clutch members responsive to centrifugal force, and means operable responsive to the initial frictional engagement of the friction means effecting a progressive buckling action and coacting with the friction means and the other clutch member to apply a progressive wedging action between said friction means and said other clutch member to cause rotation of said clutch members in unison.

3. The combination with relatively rotatable clutch members having operatively disposed therebetween friction means adapted for initial frictional engagement with one of said clutch members responsive to centrifugal force, of means connected at one end to one of said members and free to move circumferentially progressively buckling responsive to the initial frictional engagement of the friction means and coacting with said friction means and the other clutch member to apply a progressive wedging action between said friction means and said other clutch member to cause rotation of said clutch members in unison.

4. In an automatic speed responsive clutch, inner and outer clutch members, a flexible articulatible weighted element including circumferentially disposed links pivotally connected one to another mounted between said inner and outer clutch members and connected to the inner clutch member to rotate therewith, and a friction member encircling the outer face of said flexible weighted element and engaging said outer clutch member when the inner clutch member attains a predetermined speed of rotation and said element buckles progressively outwardly under the action of centrifugal force.

5. In an automatic speed responsive clutch, inner and outer clutch members mounted for relative rotation, a flexible, articulatible, centrifugal actuator including pivotally connected circumferentially disposed links extending about the circumference of and connected at its trailing end relative to the rotation of said inner clutch member to said inner clutch member, and a friction element disposed outwardly of said flexible centrifugal actuator and moved into frictional engagement with said outer clutch element when the inner clutch member attains a predetermined speed of rotation.

6. In an automatic speed responsive clutch, inner and outer clutch members mounted for relative rotation, a flexible, articulatible, centrifugal actuator comprised of circumferentially disposed jointed elements capable of buckling mounted between said members and connected at its one end to said inner clutch member, said actuator buckling and moving into frictional engagement with said outer clutch member when the rotational speed of the inner clutch member attains a predetermined angular velocity.

7. In an automatic speed responsive clutch, inner and outer clutch members mounted for relative rotation, a flexible, centrifugal actuator including circumferentially disposed links pivotally connected one to another mounted between said members and connected at one end to said inner clutch member, said actuator extending circumferentially thereabout to be moved into frictional engagement with said outer clutch member when the rotational speed of the inner clutch member attains a predetermined angular velocity.

8. In an automatic speed responsive clutch, inner and outer clutch members mounted for relative rotation, a flexible, articulatible, centrifugal actuator comprised of circumferentially disposed jointed elements capable of buckling extending circumferentially about said inner clutch member and connected at one end thereto, a friction element secured to said actuator moved into frictional engagement with said outer clutch member when the inner clutch member is rotated above a predetermined speed, and yielding spring means connecting the free end of said centrifugal actuator to the inner clutch member.

9. In an automatic speed responsive clutch, inner and outer clutch drums mounted for relative rotation, a friction element mounted between said inner and outer clutch drums, and a flexible, articulatible, centrifugal actuator comprised of circumferentially disposed jointed elements capable of buckling encircling the inner clutch drum, the trailing end of said actuator relative to the direction of rotation of said inner clutch drum being connected thereto to urge said friction element into frictional engagement with said outer drum when said inner drum is rotated at a predetermined speed.

10. In an automatic speed responsive clutch, inner and outer clutch drums arranged concentrically and mounted for relative rotation, a friction clutch band mounted between said drums, and a link chain encircling and connected to said inner drum and connected to said friction band to urge the friction band into frictional engagement with said outer drum when the speed of the inner drum attains a predetermined speed of rotation.

11. In an automatic speed responsive clutch, inner and outer clutch drums mounted concentrically for relative rotation, a friction clutch band mounted between said clutch drums, and a link chain centrifugal actuator encircling said inner drum with its trailing end connected thereto and its free end connected to said friction band.

12. In an automatic speed responsive clutch, inner and outer clutch drums mounted concentrically for relative rotation, a friction clutch band mounted between said drums, and a flexible chain connected to said friction band and to said inner drum, said chain being formed of pivotally connected link units consisting of a plurality of chain links arranged in side by side relation and positioned to urge the flexible band into frictional engagement with the outer drum when the inner drum is rotated at a predetermined speed.

13. In an automatic speed responsive clutch, inner and outer clutch drums mounted concentrically for relative rotation, a flexible link chain mounted between said drums with one end connected to said inner drum, spring means yieldingly connecting the other end of said link chain to said inner drum, and a clutch band connected to said link chain arranged to be urged into frictional engagement with said outer drum when the inner drum is rotated above a predetermined speed.

14. In an automatic speed responsive clutch, inner and outer clutch drums mounted concentrically for relative rotation, a flexible link chain connected at one of its ends to the inner clutch drum and arranged to encircle said inner drum, a friction clutch band connected to the free end of said link chain with its opposite end adjacent the connection of said link chain, spring means yieldingly connecting the free end of the link chain to the inner drum, and spring means yieldingly connecting the free end of said friction clutch band to the inner drum.

15. In an automatic speed responsive clutch, inner and outer clutch drums mounted concentrically for relative rotation, a flexible link chain connected at one of its ends to the inner clutch drum and arranged to encircle said inner drum, a friction clutch band connected to the free end of said link chain with its opposite end adjacent the connection of said link chain, spring means yieldingly connecting the free end of the link chain to the inner drum, and spring means yieldingly connecting the free end of said friction clutch band to the inner drum, said friction clutch band being arranged to frictionally engage the outer drum under the centrifugal force of said link chain when the inner drum is rotated above a predetermined speed.

16. In an automatic speed responsive clutch, inner and outer clutch drums mounted concentrically for relative rotation, a flexible link chain mounted between said drums and encircling said inner drum, means connecting one end of said link chain to said inner drum, a friction clutch band having one end connected to the free end of said link chain and arranged to frictionally engage said outer drum, said friction band extending circumferentially about the link chain with its opposite end adjacent the connection of said link chain with said inner drum, spring means connecting the free end of said friction band with said inner drum, spring means connecting the free end of said link chain with said inner drum, and means for adjusting the tension of said last-named spring means.

17. In an automatic speed responsive clutch, inner and outer clutch drums mounted concentrically for relative rotation, a flexible link chain arranged circumferentially between said inner and outer drums with one end connected to the inner drum, a friction band connected to the free end of said link chain adapted to be urged into frictional engagement with the outer drum under the influence of the centrifugal force developed by the link chain at certain speeds of rotation, and spring means yieldingly connecting the free end of said link chain to the free end of said friction band.

18. In an automatic speed responsive clutch, inner and outer clutch drums arranged concentrically and mounted for relative rotation, a link chain arranged circumferentially about said inner drum with its trailing end connected thereto, a flexible friction band encircling said link chain connected at one end to the free end of said link chain such that the centrifugal force created by said link chain upon rotation of said inner drum at certain speeds will urge the friction band into frictional engagement with said outer drum and initiate a buckling self-energizing action of said link chain and spring means yieldingly connecting said link chain and friction band to the inner drum.

19. In an automatic speed responsive clutch, inner and outer clutch drums arranged concentrically and mounted for relative rotation, a link chain disposed between said clutch drums having one end connected to said inner drum, a flexible friction band encircling said link chain connected to the free end thereof, an adjusting lever on said inner drum, and a coil spring yieldingly connecting said link chain to said adjusting lever.

20. In an automatic speed responsive clutch, inner and outer clutch drums arranged concentrically and mounted for relative rotation, a link chain disposed between said clutch drums having one end connected to said inner drum, a flexible friction band encircling said link chain connected to the free end thereof, an adjusting lever on said inner drum, a coil spring yieldingly connecting said link chain to said adjusting lever, and a coil spring yieldingly connecting the free end of said flexible friction band to said inner drum.

21. In an automatic speed responsive clutch, inner and outer clutch drums mounted concentrically for relative rotation, said inner drum being formed with an annular channel-way, a flexible link chain arranged in and encircling said channelway with one end connected to the flanges of said channel-way, a flexible friction band having one end connected to the free end of said link chain and its other end adjacent said link chain connection with said drum, and spring means in said channel-way yieldingly connecting the free end of said link chain to the free end of said friction band such that the centrifugal force of said link chain will urge the friction band into frictional engagement with the inner peripheral surface of said outer drum when said inner drum is rotated above predetermined speeds to initiate a self-energizing action of said link chain whereby said link chain will be expanded circumferentially and exert additional force on said friction band in a radial direction.

22. In an automatic speed responsive clutch, inner and outer clutch drums arranged concentrically and mounted for relative rotation, a friction clutch band interposed between and connected to one of said drums, and a link chain encircling and connected to said inner drum to move outwardly under the effect of centrifugal force and force said band into driving engagement with said outer drum when the speed of the inner drum attains a predetermined speed of rotation.

References Cited in the file of this patent

UNITED STATES PATENTS

| Number | Name | Date |
| --- | --- | --- |
| 751,027 | Sweetland | Feb. 2, 1904 |
| 1,994,141 | Madden | Mar. 12, 1935 |
| 2,021,921 | Osterholm | Nov. 26, 1935 |
| 2,035,242 | McCann | Mar. 24, 1936 |
| 2,087,488 | Stanley | July 20, 1937 |
| 2,513,798 | Hatfield | July 4, 1950 |
| 2,596,193 | Zeig | May 13, 1952 |

FOREIGN PATENTS

| Number | Country | Date |
| --- | --- | --- |
| 439,424 | France | Apr. 6, 1912 |
| 826,724 | France | Apr. 7, 1938 |